E. SCHALLER.
FREEZING MACHINE.
APPLICATION FILED JULY 26, 1910.

1,009,793.

Patented Nov. 28, 1911.

2 SHEETS—SHEET 1.

WITNESSES
W. P. Burk
John G. Percival

INVENTOR
Elizabeth Schaller
BY Mr. Wallace White
ATTY.

COLUMBIA PLANOGRAPH CO., WASHINGTON, D. C.

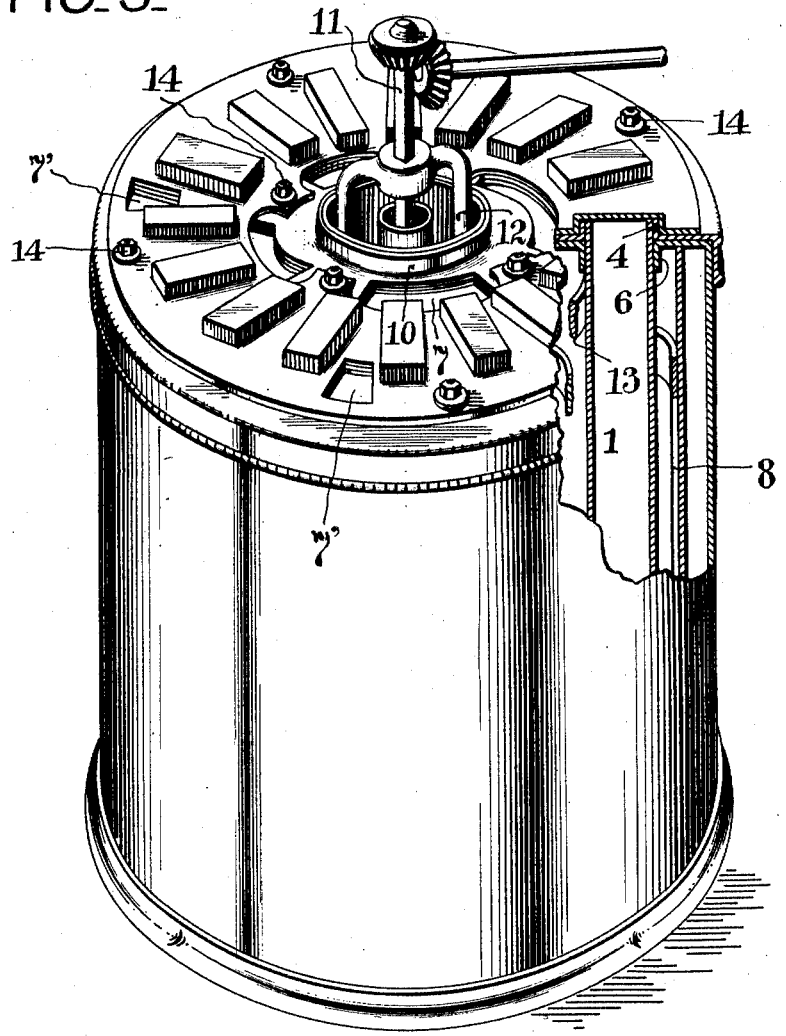

UNITED STATES PATENT OFFICE.

ELIZABETH SCHALLER, OF PARIS, FRANCE.

FREEZING-MACHINE.

1,009,793.  Specification of Letters Patent.  Patented Nov. 28, 1911.

Application filed July 26, 1910. Serial No. 573,875.

*To all whom it may concern:*

Be it known that I, ELIZABETH SCHALLER, a citizen of the Republic of France, residing at 60 Rue du Ranelagh, Paris, France, have invented certain new and useful Improvements in Freezing-Machines, of which the following is a specification.

This invention relates to improvements in freezers for the rapid manufacture of ice cream and ices in which the ice-molds are arranged radially in the freezing chamber.

Figure 1:
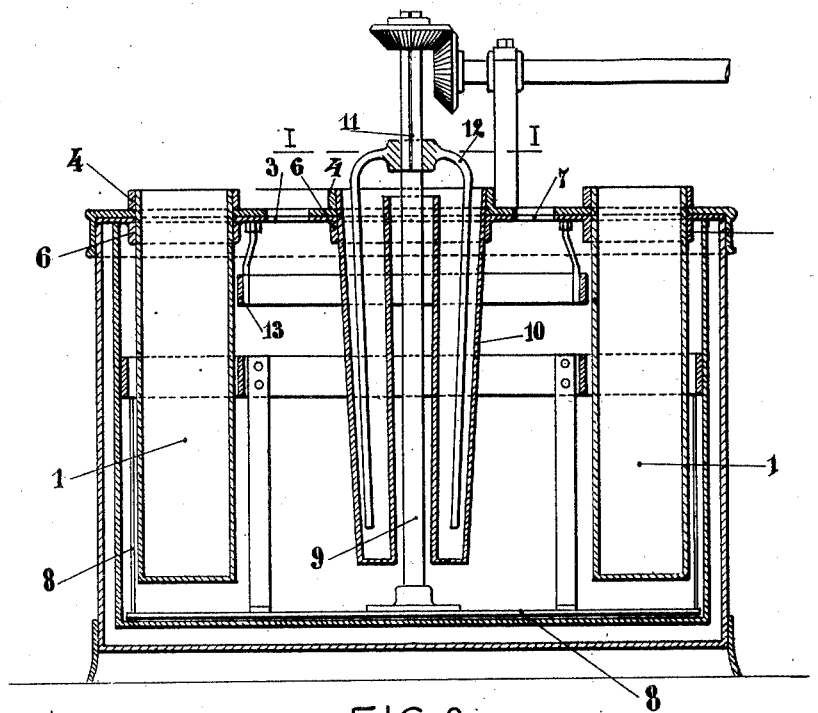
Figure 2:
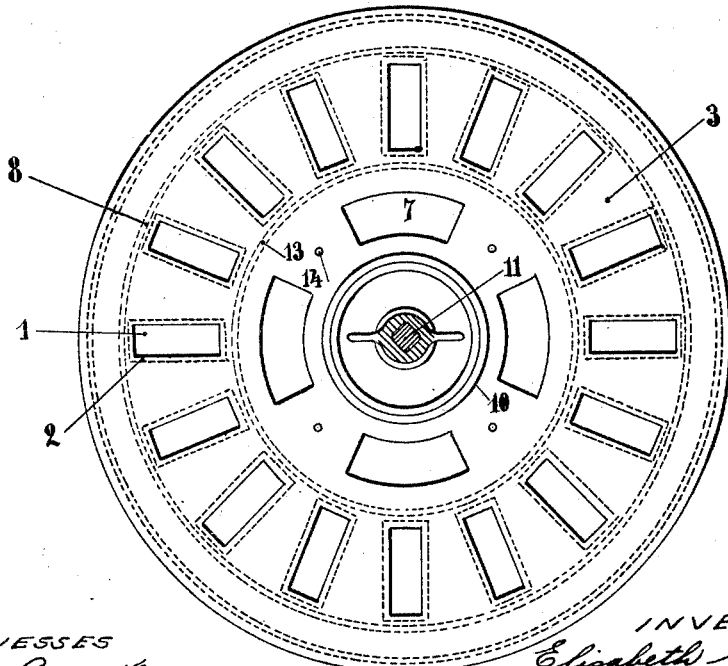

These improvements consist in a combination of radially disposed ice molds with a single cream can, furnished with a separate beater mounted on the same shaft as the refrigerant agitator. This combination is illustrated by way of example in the accompanying sheet of drawings, Figure 1 being a vertical section through the axis of the improved machine, Fig. 2 being a plan of the same partly in horizontal section through I—I, in Fig. 1, Fig. 3 is a perspective view of the machine with the cover in position, part being shown in section for the sake of clearness.

As will be seen from the figures, the molds 1 which are preferably rectangular in cross-section are arranged according to the radii of the cylinder that forms the freezing chamber, thus producing the characteristic radiating arrangement of which mention has been made above. However, the openings 7 through which the freezing medium is poured, instead of being arranged in the periphery of the cover, are placed near the center so as to leave in the center sufficient space for placing a single cream can 10 through which the shaft 9 of the agitator 8 runs. In order that this cream can may be practically utilized, a beater 12, the arms of which dip into the cream-mold, is mounted on a square projecting part of the shaft 9. The cream is thus constantly worked through the same motion by which the refrigerant agitator 8 is actuated.

The cream can is furnished with guides 6 and a ring or collar 4. The guide 6 has the same sectional form as the can. It prevents the said can from shaking about and coming into contact with the adjacent molds. The molds are suspended in the interior of the freezing chamber by the rings or collars 4.

An interior ring 13 fixed to the cover 3 by suitable means, is intended for keeping the molds 1 in position, and preventing them from shaking about in consequence of the movements of the freezing medium agitated by the agitator 8.

The agitator 8 may have one or two rings, according to the dimensions of the machine. In the drawing two are shown, the one working below the openings 7, the other moving between the outside of the molds and the sides of the tank.

With regard to the molds 1 instead of each having a cover they may all be covered by a single cover secured by bolts or any other suitable means, to the cover 3 of the tank, as shown in Fig. 3, the securing being effected at 14, between the openings 7.

It is further evident that the agitator-shaft may be actuated by a motor, or could be simply operated by hand by means of a crank-handle.

What I claim and desire to secure by Letters Patent is:—

1. In a freezer, in combination, a plurality of radially arranged ice molds, a single cream can positioned centrally of the freezer, a rotatable shaft, an agitator mounted thereon and positioned within the freezer and a beater mounted on said shaft and positioned within the cream can.

2. In a freezer, in combination, a plurality of radially arranged ice molds, a single cream can positioned centrally of the freezer, a rotatable shaft, an agitator mounted thereon and positioned within the freezer, a beater mounted on said shaft and positioned within the cream can and means for keeping the molds in position.

3. In a freezer, in combination, a plurality of radially arranged ice molds, a single cream can positioned centrally of the freezer, a rotatable shaft, an agitator mounted thereon and positioned within the freezer, a beater mounted on said shaft and positioned within the cream can and a ring within the freezer for keeping the ice molds in position.

4. In a freezer, in combination, a plurality of radially arranged ice molds, a single cream can positioned centrally of the freezer, a rotatable shaft, an agitator mounted thereon and positioned within the freezer, a beater mounted on said shaft and positioned within the cream can and a single cover adapted to engage with all of said ice molds to hold them in position.

In testimony whereof I have affixed my signature, in presence of two witnesses.

ELIZABETH SCHALLER.

Witnesses:
 H. C. COXE,
 DOMINIQUE CASALONGA.

Copies of this patent may be obtained for five cents each, by addressing the "Commissioner of Patents, Washington, D. C."